Figure 1:
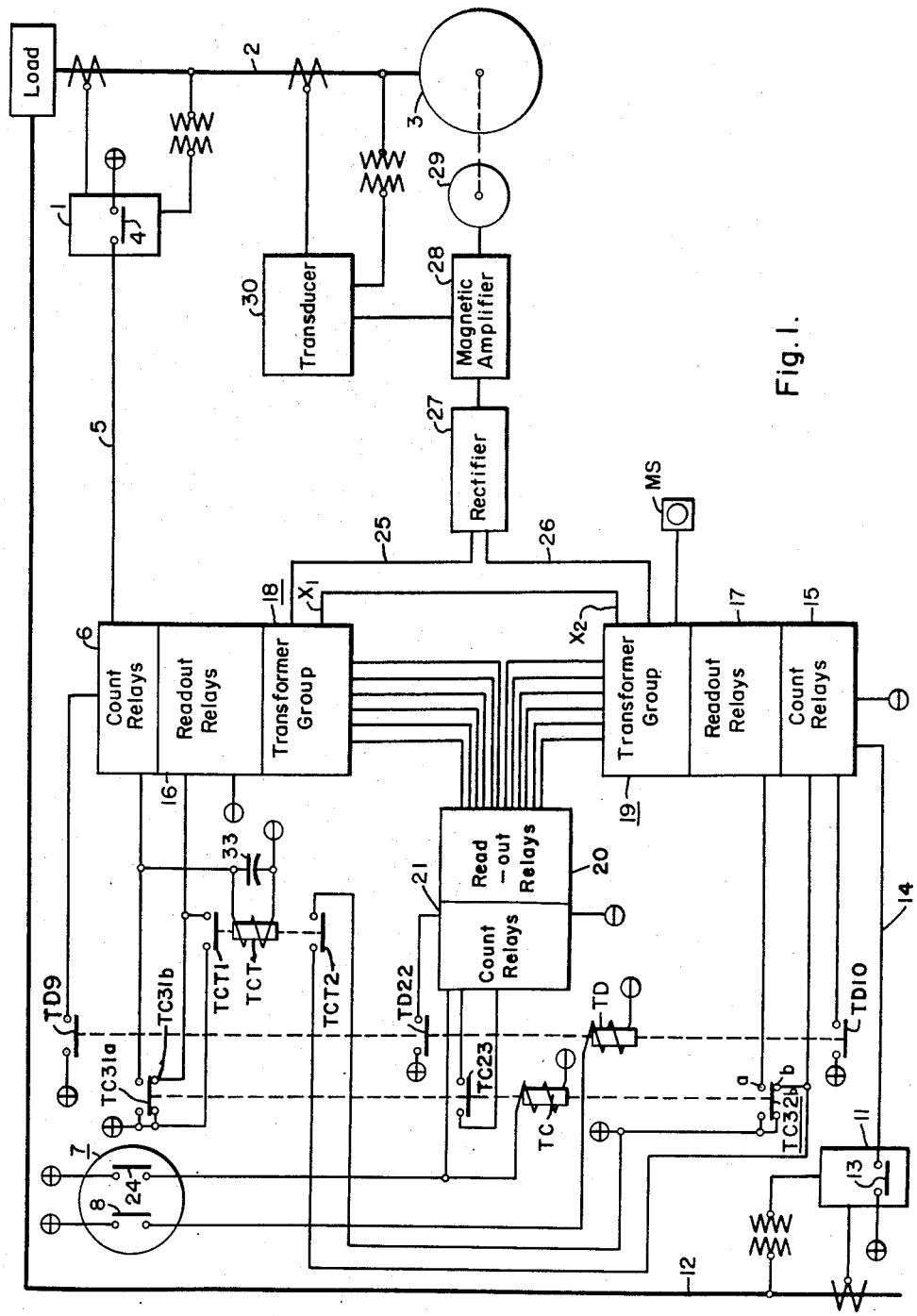
Figure 2A:
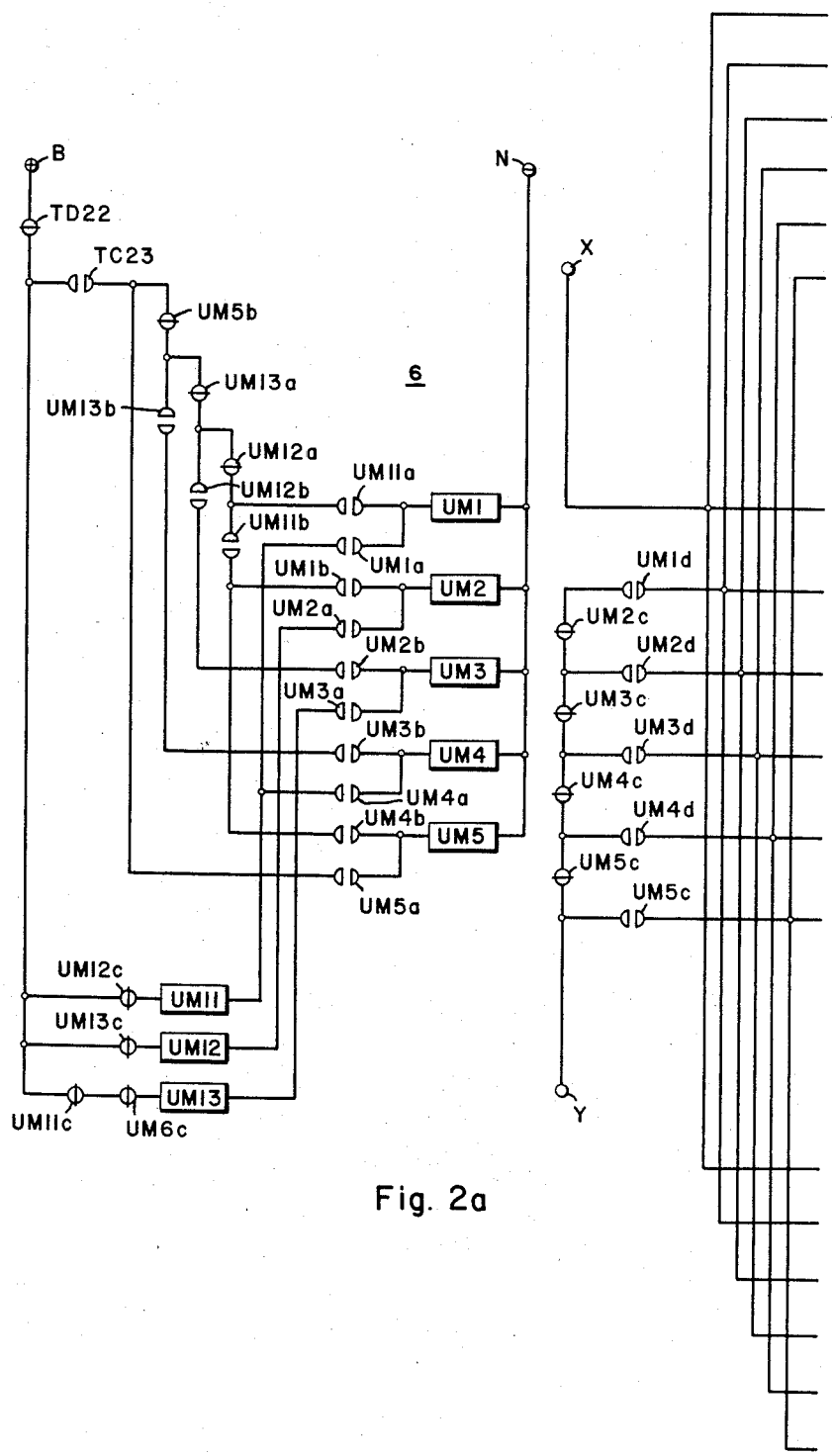
Figure 2B:
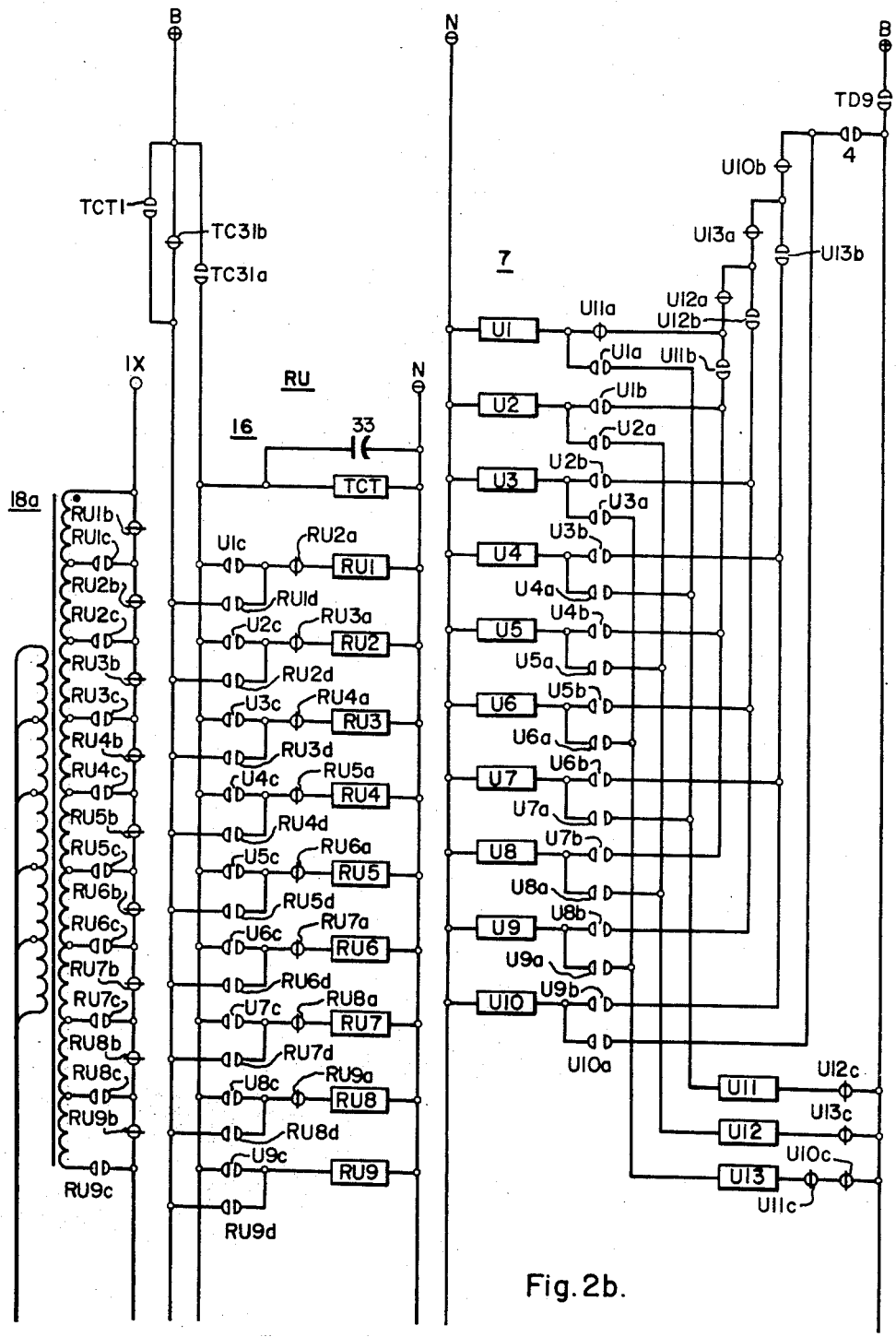
Figure 2C:
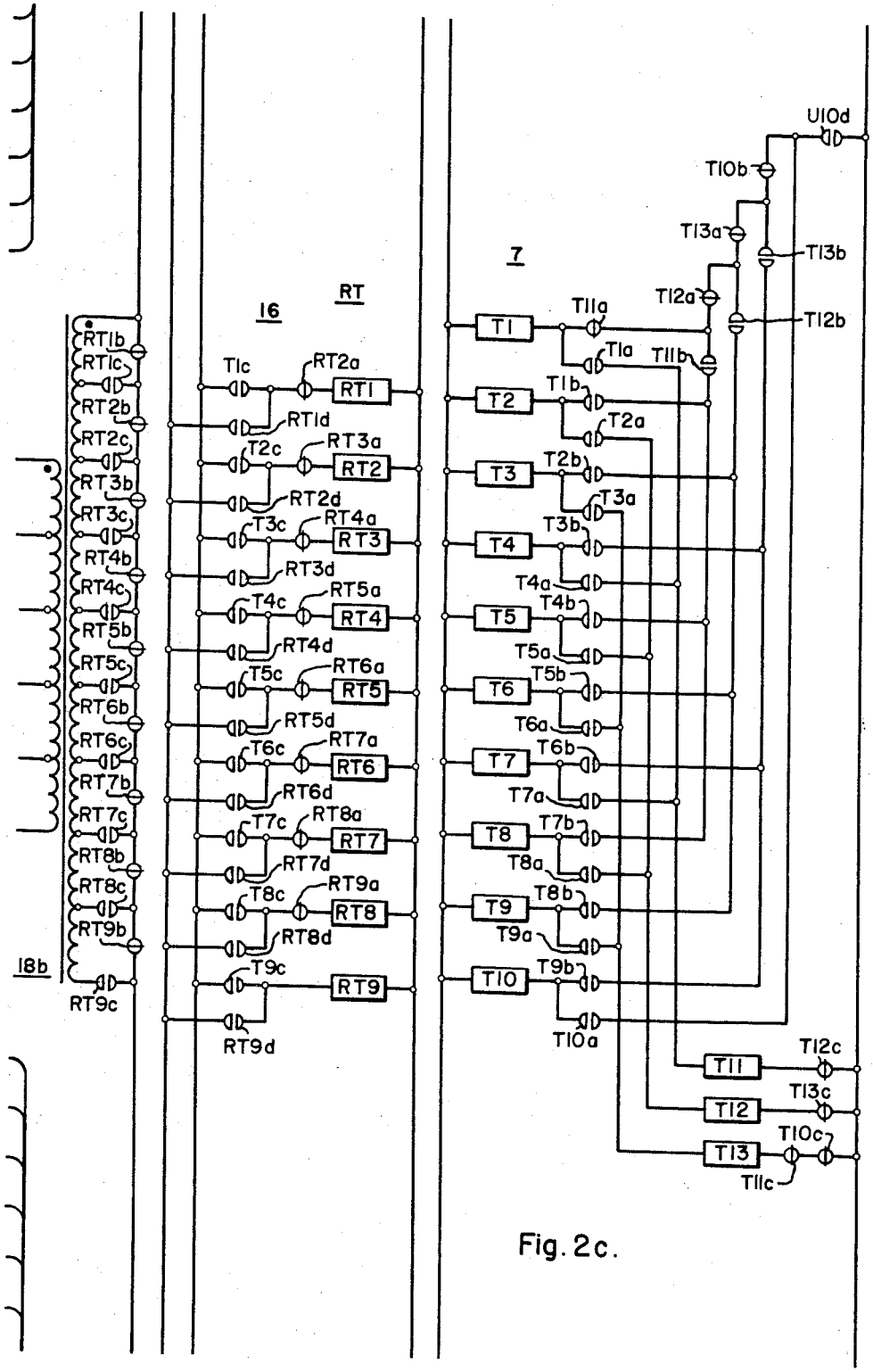
Figure 2D:
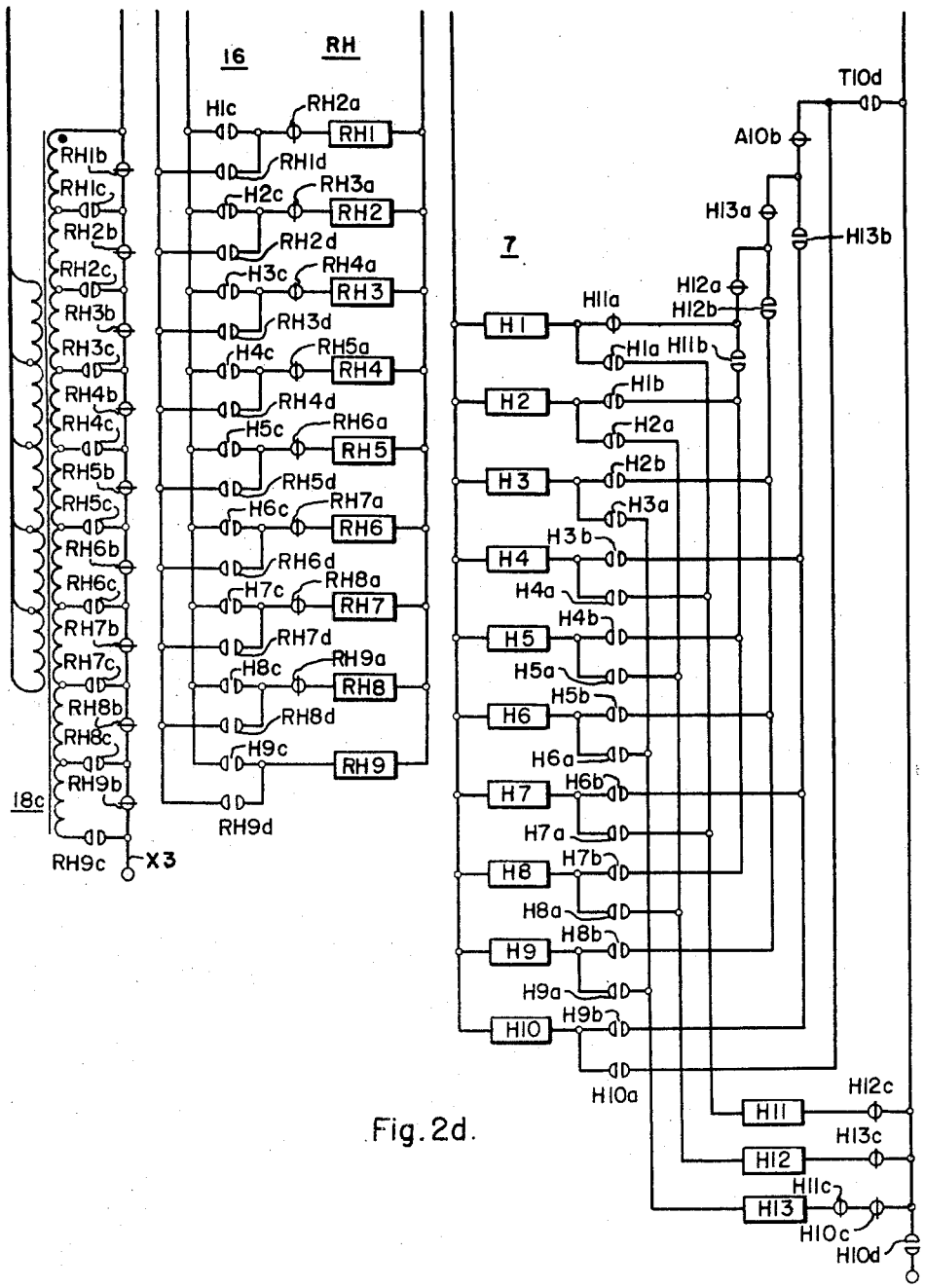

Nov. 17, 1959  M. J. BROWN  2,913,592
AUTOMATIC GENERATION CONTROL
Filed Oct. 30, 1958  9 Sheets-Sheet 2

Nov. 17, 1959   M. J. BROWN   2,913,592
AUTOMATIC GENERATION CONTROL
Filed Oct. 30, 1958   9 Sheets-Sheet 3

Nov. 17, 1959

M. J. BROWN 2,913,592

AUTOMATIC GENERATION CONTROL

Filed Oct. 30, 1958

9 Sheets-Sheet 6

United States Patent Office
2,913,592
Patented Nov. 17, 1959

2,913,592

AUTOMATIC GENERATION CONTROL

Myron J. Brown, Forest Hills, Pa., assignor to Westinghouse Electric Corporation, East Pittsburgh, Pa., a corporation of Pennsylvania Application October 30, 1958, Serial No. 770,774

10 Claims. (Cl. 307—57)

This invention relates to an automatic generation control system, and more particularly to a generation control system capable of maintaining a tie line feed supply demand level below a selected value.

Industrial power consumers are billed for the amount of power used and in addition, for the maximum demand encountered during the billing period. Since it is difficult to provide means for reducing the total kilowatt hours used in an industrial plant during a billing period, and since an industrial user pays a premium for a high demand operation, the present system is provided for reducing the demand cost.

It is therefore an object of this invention to provide a computer capable of monitoring and automatically reducing the maximum demand required by an industrial user.

It is another object of this invention to provide a computer system capable of sampling the demand of the supply tie line and the demand of the load in order to provide load control for maintaining a maximum selected demand of the tie line.

It is another object of this invention to provide a computer system capable of periodically sampling the tie line demand and generator output to provide a correction for the generator output that is proportional to the comparison of the tie line and generator demand readings.

It is another object of this invention to provide a computer capable of taking sequential samples of the tie line and generator demands for adjustment of the generator loading.

It is another object of this invention to provide the use of memory relays providing control voltages proportional to the demand level of the tie line and generator.

It is another object of this invention to provide a simplified computer capable of adjusting the demand level of tie line supply power to a desired selected level.

Other objects, purposes and characteristic features will become obvious as the description of the invention progresses.

In practicing this invention, there is provided a watthour and demand meter capable of sampling input of the tie line to an industrial consumer. A second watthour and demand meter is provided for either sampling the generator output of a small generator belonging to the consumer, or the watthour and demand of the load maintained by the consumer. The outputs in the two watthour meters are then used to control counting chain relays capable of adjusting the secondary paths of related transformers to levels corresponding to the rate of power used. The associated transformers are then provided with primary windings controlled by another set of counting chain relays and readout relays which are, in turn, controlled by a time clock and limited by a demand period. The voltages developed by the secondaries of the two related transformers are then combined, rectified and applied as control voltage in a magnetic amplifier. The magnetic amplifier in turn controls a governor for establishing the power output of the governor controlled prime mover and generator. The output of the generator is then sampled by the transducer and used to control the magnetic amplifier for establishing an output level established by the input of the rectifier.

Figure 4:
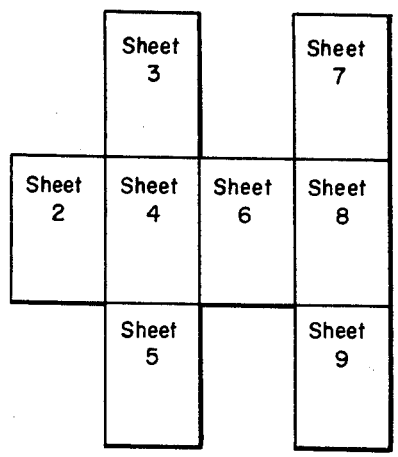
Figure 3A:
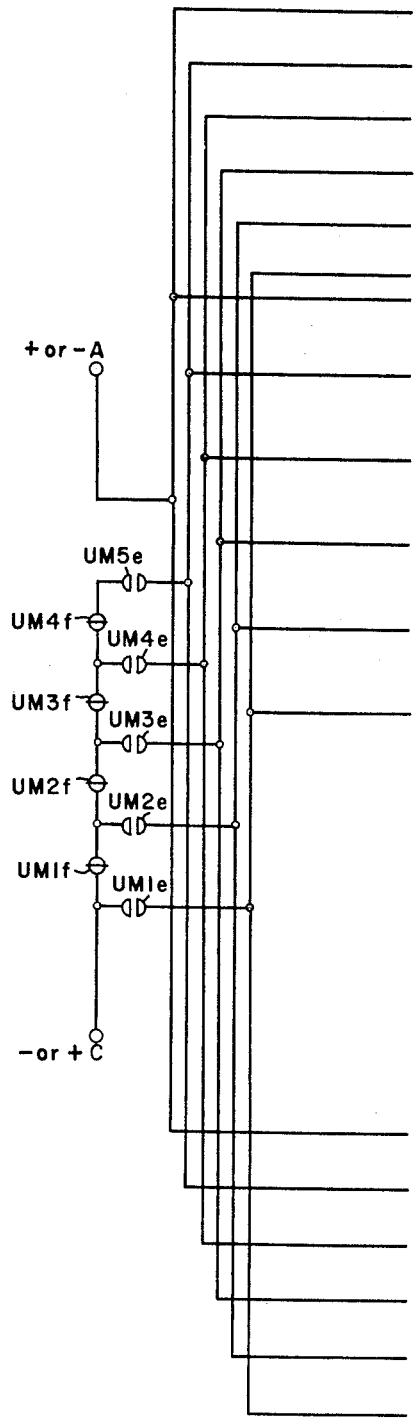
Figure 3B:
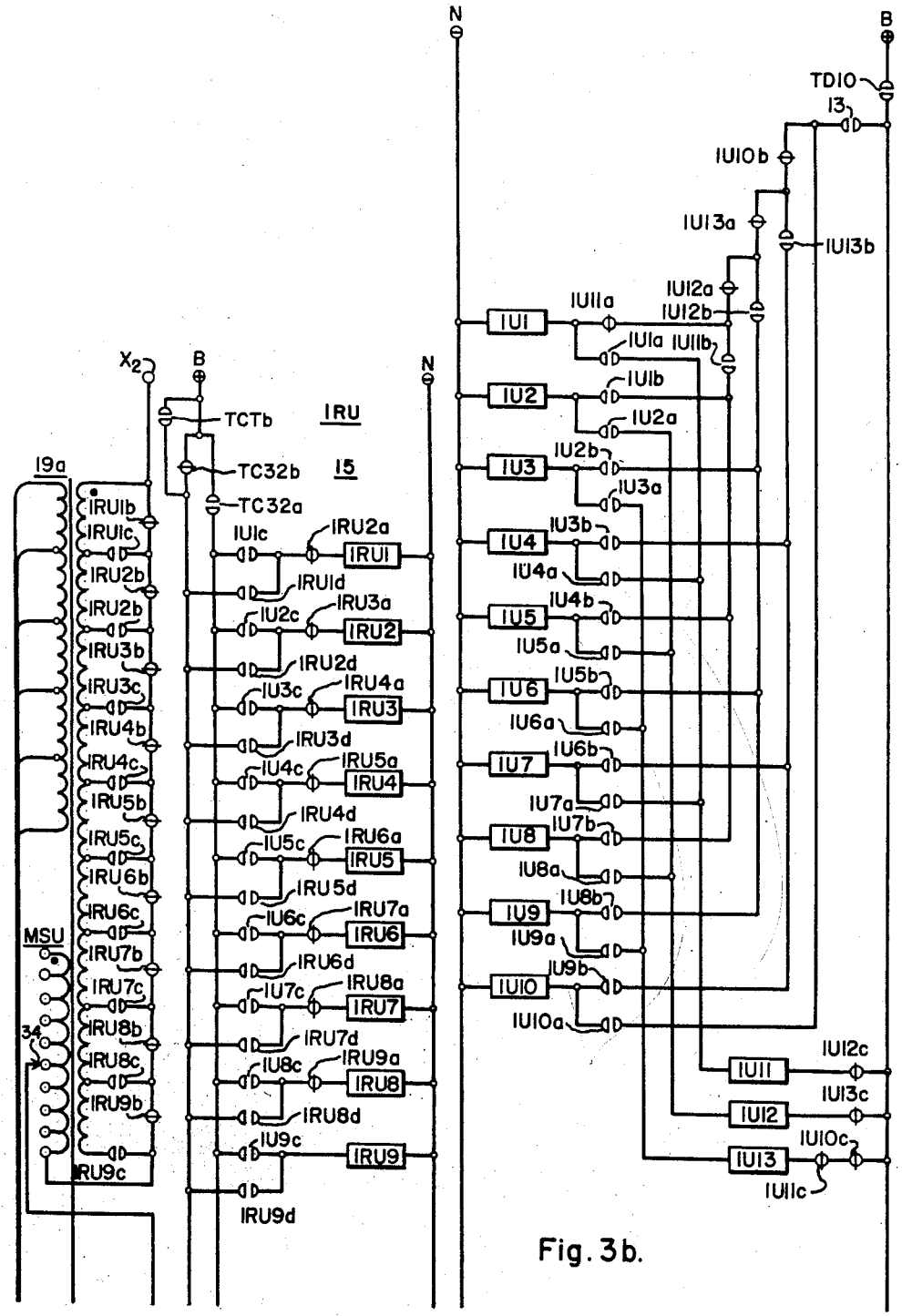
Figure 3C:
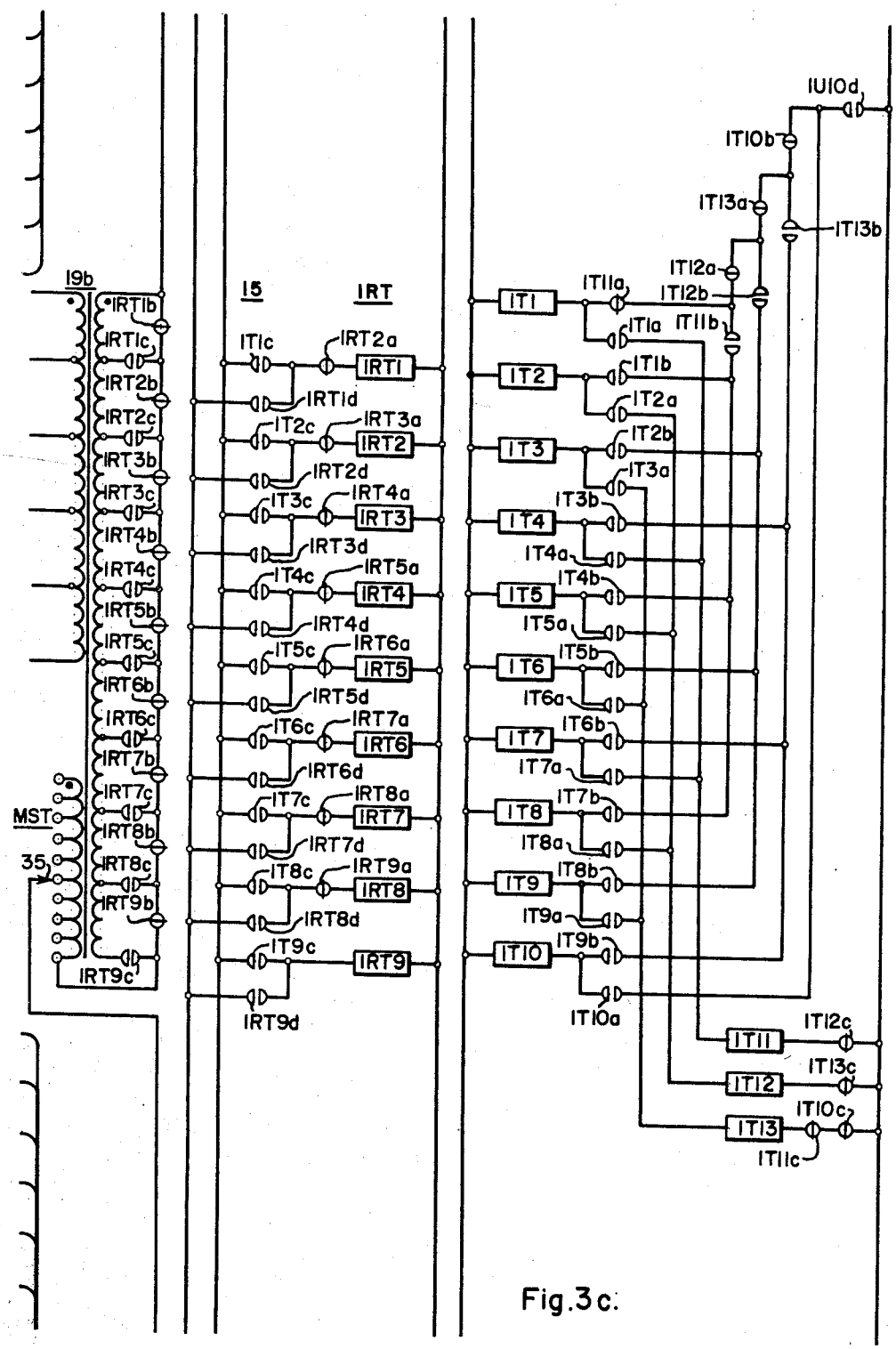
Figure 3D:
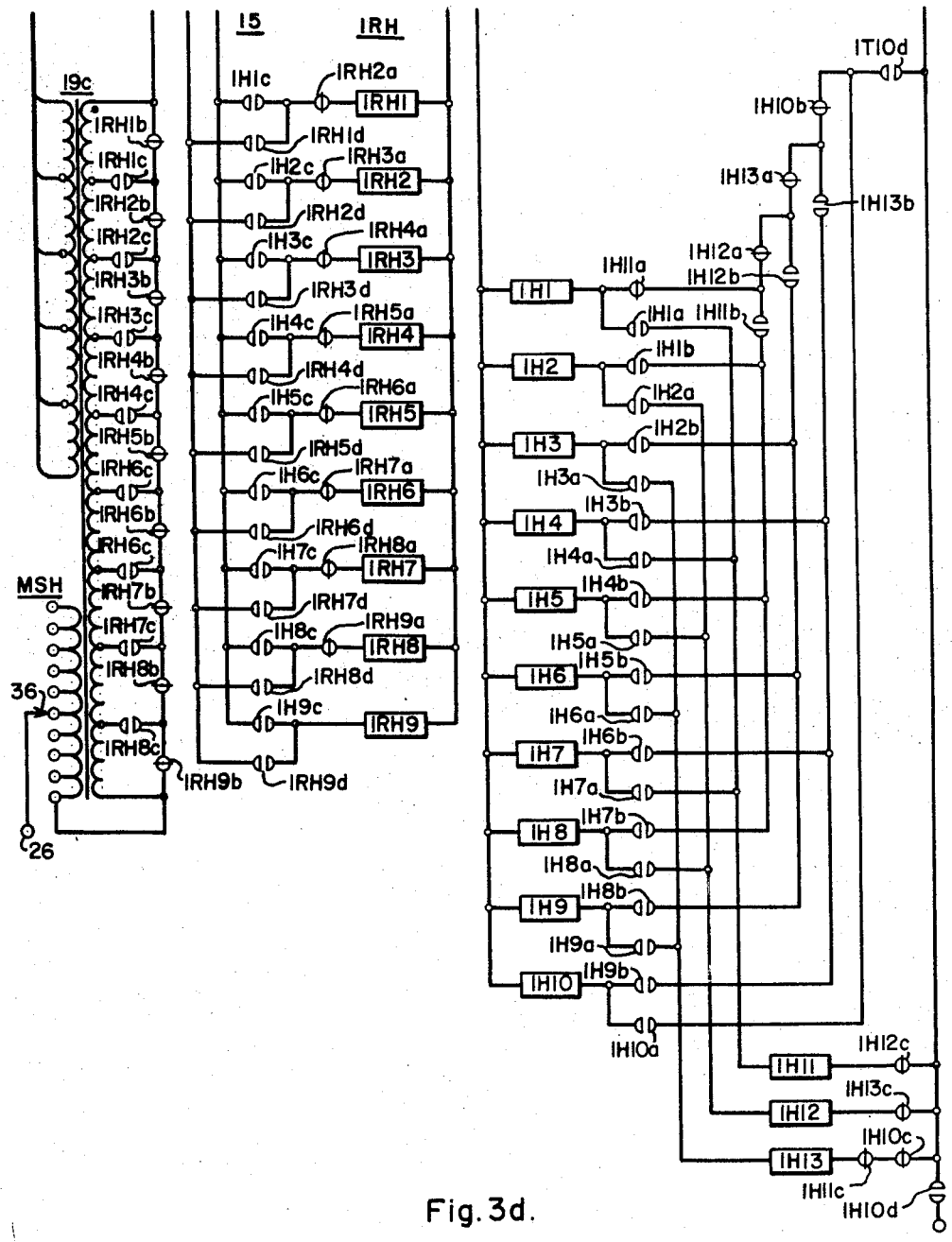

Figure 1 is a diagrammatic view of the overall computer system in which the demand of the tie line and the demand of a local generator is compared;

Figs. 2a through 2d, and 3a through 3d provide a detailed view of the computer circuitry necessary for the control of a magnetic amplifier used for demand regulation control; and Fig. 4 is a drawing sheet placement view showing proper placement of the different sheets of the drawing to facilitate study of the complete circuit.

In each of the several views, similar parts bear like reference characters.

The automatic generation control computer shown in Fig. 1 comprises a watthour demand meter 1 connected to the generator supply line 2 of the plant located generator 3 capable of supplying a portion of the power necessary for the load to be carried by the consumer. The watthour demand meter 1 is provided with a contact 4 capable of opening and closing at a rate proportional to the power being delivered by the generator 3. The contact 4 supplies impulses over the conductor 5 to a plurality of counting relays shown in block form as 6 in Fig. 1 and shown in detail in Figs. 2b, 2c, and 2d. The counting relays are activated at the beginning of any suitable demand period such as a 30-minute demand period established by a time clock 7 provided with the contact 8 that is normally closed and opened at the beginning and at the end respectively of each 30-minute period. When the contact 8 is closed by the time clock 7, the time demand relay TD becomes energized closing the contacts TD9 and TD10 for the purpose of controlling the counting relays as explained hereinafter. The contact TD9, upon becoming closed, provides energy to the counting relays represented by the block 6 for the purpose of allowing the counting relays to count, the impulses provided by the watthour demand meter 1 through its contact 4.

In addition to the watthour demand meter 1, there is provided a demand meter 11 connected to an associated tie line 12 capable of supplying power to the consumer load from a local utility system in addition to the power line 2. The watthour demand meter 11 is also provided with a suitable contact member 13 that is alternately closed and opened at a rate proportional to the flow of power through the tie line 12. The contact member 13 is connected through the conductor 14 to a block form showing of a suitable group of counting relays 15 capable of being energized by the combination of the movable contact 13 and the demand contact TD10 previously noted as being associated with the TD relay.

The counting chain relays represented by the blocks 6 and 15 are provided with readout relay groups 16 and 17 respectively. The readout relays are capable of storing the count of the counting chains without affecting the counting chain operation. The readout relays represented by the blocks 16 and 17 are then connected to provide tap changing operation in a pair of transformer groups 18 and 19, respectively, in a manner to be explained in detail hereinafter. The readout relays 16 and 17 are connected to control only the secondary windings of the transformer groups 18 and 19 as will be explained hereinafter. In addition, the transformer group 19 is provided with a manual setting control MS for additionally varying the secondary turns of the transformer group 19, as will be explained hereinafter. The primary windings of the transformer groups 18 and 19 are connected to suitable readout relays represented by the block 20 for the purpose of varying the taps of the primary windings of the transformer groups 18 and 19, in accordance with the counting relays represented by the block 21. The counting relays represented by the block 21 are activated through the combination of a demand contact TD22 positioned on the demand relay TD and the control dictated by the time-to-compute relay TC contact TC23. The time-to-compute relay TC is a relay that is energized periodically at time intervals selected by the time clock 7. In order to accomplish this, a timing contact 24 associated with the time clock 7 is provided. The timing contact 24 is normally opened and momentarily closed by the clock 7 at certain specific time intervals such as 5-minute intervals, the time intervals used for the purpose of description in the present disclosure.

The secondaries of the transformer groups 18 and 19 are then algebraically combined and fed through the conductors 25 and 26 to a suitable rectifier 27 capable of providing a unidirectional current for a control winding of a suitable magnetic amplifier 28. The magnetic amplifier 28 is provided with an output to a suitable governor and prime mover 29 capable of controlling the output of the generator 3. In order to stabilize the output of the generator at the selected level established by the magnetic amplifier 28, a transducer 30, of any suitable well-known type, is provided for sampling the power output on the conductor 2 leading from the generator 3. The output of the transducer is then fed into the magnetic amplifier 28 to provide a stabilizing control bias for the magnetic amplifier.

In order to see how the proportional control is obtained, it is necessary to show the proportional control of the transformer groups 18 and 19 in detail by showing the details of the counting relay and readout relay arrangements. The details of the counting relays and readout relays represented by the blocks 6 and 16, respectively, for controlling the secondary of the transformer group 18 and the use of the time clock 7 in controlling counting and readout relays 21 and 20, respectively, for controlling the primaries of the transformer group 18, are shown in Figs. 2a through 2d.

Assuming that the time demand period is 30 minutes during which the clock 7 maintains the contact 8 closed, it can be seen that the TD relay will be maintained energized throughout this 30-minute period. At the beginning of the demand period, TD becomes energized closing its contacts TD9 and TD10. On Fig. 2b, in response to the closure of the contact TD9, a circuit is completed for allowing the watthour demand meter 1, contact member 4 to start the counting relays into operation. With the contact TD9 closed and with the contact 4 becoming closed in response to power being delivered by the generator 3, energy is supplied from the source terminal B, over the now closed contact TD9 of the TD relay, the now closed contact 4 of the watthour demand meter 1, the closed back contact U10b, the now closed back contact U13a, the now closed back contact U12a, the now closed back contact U11a, the winding U1, to the negative source conductor N. It is pointed out that the contacts, when referred to as back contacts, are indicated as being closed when its associated relay is deenergized. For example, the U10b contact is one contact of the U10 relay which is at this time deenergized. With the U10 relay deenergized, the back contact shown as the diagonal line through relay contacts, is closed. With the previously traced circuit being completed, the U1 relay of the ten unit counting relays becomes energized. Upon becoming energized, the U1 relay closes its contacts causing the U1a contact to become closed for completing a pickup circuit for the U11 relay. The pickup circuit of the U11 relay can be traced from the positive terminal B over the now closed back contact U12c, the winding of the relay U11, the now closed contact U1a, the winding of the relay U1 to the negative terminal N, the source of power, not shown. The relay U11 does not pick up at this time since it is shunted by the pick up circuit for the U1 relay. When the contact 4 of the watthour demand meter 1 again becomes opened, interrupting the pickup circuit for the U1 relay, the relay U11 becomes energized and held energized by the closure of the U1a contact. The relays U1 and U11 are maintained energized in a series stick circuit including the contact U1a of the U1 relay.

Energization of the U11 relay causes the U11a contact to become opened, further interrupting the previously already interrupted energizing circuit for the relay U1. At the same time, the U11b contact of the U11 relay prepares a pickup circuit for the U2 relay which will become energized on the next closure of the contact 4. Upon the closure of the contact 4, the second time an energizing circuit for relay U2 becomes completed over the previously traced circuit for U1 including the contacts TD9, 4, U10b, U13a, U12a and the additional contact U11b now closed, the now closed contact U1b, the relay winding U2 to the negative source terminal N. Energization of the relay U2 causes its front contact U2a to become closed energizing the bus to relay U12. This circuit, presently short circuited by 4 being closed but later to be energized by the opening of 4, can be traced from the source terminal B through the demand contact TD9, the now closed back contact U13c, the relay winding U12, the now closed front contacts U2a, the winding U2, to the negative source terminal N. Upon the opening of 4 and the energization of the relay U12, the latter interrupts the hold or stick circuit for the relays U1 and U11 through the opening of the back contact U12a and U12c. In response to this action U1 and U11 become deenergized. In addition, the back contact U12a interrupts any possible pickup circuit for U1 and U2 on the next operation of contact 4 while at the same time the front contact U12b establishes a pickup circuit for the next count relay U3. As power is continued to be delivered through the conductors 2 leading from the generator 3, the contact 4 again becomes closed, causing the relay U3 to be energized over the now closed contacts U12b and U2b. Energization of the relay U3 causes its hold circuit to be established through its front contact U3a, which in turn sets up the circuit for the relay U13 to be energized upon the opening of contact 4. Energization of the relay U13 causes the relays U2 and U12 to be deenergized and through its contact U13b and contacts U3b causes the preparation of the pickup circuit for the next count relay U4 as soon as contact 4 again becomes closed. Closure of the contact 4 causes the U4 relay to be energized over the now closed contact U13b of the U13 relay in its energized condition and contacts U3b. Energization of the relay U4 establishes a hold circuit for the relay U4 over its front U4a contact which also establishes a pickup circuit for the U11 relay. Energization of the U11 relay where contact 4 opens, causes the U11c back contact to become opened causing the deenergization of relay U13 and the relay U3. This sequence is repeated until the U10 relay becomes energized and held energized over its front contact U10a until the contact 4 again becomes interrupted. During the closed period of the contact 4 and the energization of the U10 relay, the contact U10d becomes closed, causing the energization of the tens T1 counting relay. Energization of the T1 relay can be traced from the plus supply B through the closed contact TD9, the now closed contact U10d, the now closed back contact T10b, the closed back contacts T13d, T12a and T11a, the relay winding T1 to the negative source terminal N. Energization of the relay T1 causes the relay to close its front contact T1a to provide a hold circuit for the relay T1 and a pickup circuit for the relay T11. As the contact 4 moves on to a position of interruption, the relay U10 becomes deenergized, and the relay T1 remains at its energized state until the relays U1 through U10 complete another cycle. At this time, the relay T2 has become energized and the relay T1 deenergized and again the relay T2 would be held energized until the units relays U1 through U10 complete another count sequence. This counting sequence is continued until the relay T10 becomes energized, which causes the relay H1 to be energized and held until the tens relays have counted another complete sequence. At the end of this sequence, the relay H2 becomes energized. This process can continue until the maximum count relay H10 has been reached or until the end of the demand period is reached. Under normal operating circumstances the counting capacity is made sufficiently long to provide for an expiration of the demand period before the use of power can cause the count relays to count the full cycle, causing the energization of the relay H10.

Associated with the time demand period are the count relays UM1 through UM5 capable of causing a sequence of time readings to occur at even time periods throughout the demand time period, for example on 5-minute intervals. The 5-minute intervals are established by the energization of the time-to-compute relay TC through the closure of its energizing contact 24 located in the time clock 7. In addition to the previously recited contact TC23 used to sequence the counting relays UM1 through UM5, the contacts TC31 and TC32 associated with the time-to-compute relay also cause the readout relays RU1 through RU9 and RT1 through RT9 and RH1 through RH9 to read out in response to the momentary closure of the contact TC31 and readout relays 1RU1 through 1RU9 and 1RT1 through 1RT9, and 1RH1 through 1RH9 to read out in response to the momentary closure of the contact TC32.

The units read out relays RU, comprising relays RU1 to RU9, the tens readout relays RT, comprising relays RT1 to RT9, and the hundreds readout relays RH, comprising relays RH1 to RH9 operate as follows. If we assume that the count relay U1 is energized it can be seen that its contact U1C prepares a pickup circuit for the readout relay RU1 that is completed as soon as the TC relay contact TC31a moves to close its front contacts. This circuit can be traced from the positive source terminal over the now closed front contacts TC31a, the contact U1C, the back contact RU2a of the readout relay RU2, the winding of relay RU1 to the negative source of power terminal. Return of the TC relay to its deenergized condition providing a stick or hold circuit for the readout relays would cause an interruption in the pick-up circuit before the hold circuit is complete. It is therefore necessary to provide a time delayed drop out relay TCT that is connected in parallel with the readout relays to be energized as soon as the TC relay is energized. The TCT relay is provided with a capacitor 33 connected thereacross to delay relay drop out after deenergization. The TCT relay is provided with a front contact TCT1 shunting the back contact TC31b of the TC relay to provide a completed hold circuit as soon as TC is energized. Subsequent deenergization of the TC relay does not affect the hold circuit during contact TC31b transfer since this contact TCT1 maintains energy for the hold circuit until the back contact of TC31b is closed and the capacitor 33 is discharged.

In order to provide a shunt path for the back contact TC32b of the relay TC, the TCT relay is provided with a contact TCT2 placed in shunt therewith.

At the start of the demand period, the counting relays 6 and 15 start their count periods and go through their sequence in response to the closure of the contacts 4 and 13 which are closed at a rate at which power flows through the demand meters 1 and 11, respectively. This continues for a 5-minute period at which time the contact 24 becomes closed by the time clock 7 causing the energization of the first count relay in the counting relays 21 and the energization of the proper readout relay associated with the maximum count recorded in each of the counting relays. For example, if we assume that the first 5 minutes of a 30-minute demand period has expired, it can be seen that the time-to-compute relay TC becomes energized causing its relay contact TC23 to complete a pickup circuit for the relay UM1. This circuit can be traced from a source terminal B through the closed front contact TD22, the now closed contact TC23 of relay TC, the back closed make UM5b contact before break UM5a open contact, the closed back contact UM13a, the closed back contact UM12a, the closed back contact UM11a, the relay winding UM1 to the negative terminal N of the source of power. Energization of the relay UM1 causes its contact UM1a to become closed to complete a hold circuit for the relay UM1 and a pickup circuit for the relay UM11. The sequence of relay operation here is the same as that described in connection with the relays U1, U2, U3, and therefore will not be repeated. Energization of the relay UM1 also closes its contact UM1d completing a circuit for one portion of the primary windings of each of the transformers 18a, 18b and 18c. During the 5-minute period from the time the demand period is started until energization of the relay UM1, the associated secondary winding counting relays of the units, tens and hundreds in the transformer groups 18 and 19 are also counting in response to the closing and opening of the contacts 4 and 13. If we assume for example that the counting relays of the transformer group 18 have counted to the point where the relay T2 is energized in the tens group and the relay U8 is energized in the units group, we can see that 28 counts will have taken place during the first 5-minute period. Energization of the relay T2 causes its front contact T2c to be closed resulting in the energization of the readout relay RT2. Energization of the relay RT2 in turn closes its contact RT2c. Similarly, the energization of the relay U8 causes the closure of the contact U8c resulting in the energization of readout relay RU8. Energization of the readout relay RU8 results in the closure of the contact RU8c completing a secondary circuit for the transformer 18a. At the same time the relay RU8 opens its back contact, RU8b eliminating the by-pass circuit placed in parallel with the secondary winding of the transformer 18a. Likewise, the readout relay RT2 opens its back contacts RT2b in removing the by-pass circuit from the transformer 18b secondary winding. Since however, the count period of 5-minute duration is insufficient to reach the hundreds in counting, the back contacts of the readout relays RH1 through RH9 remain closed providing a by-pass circuit past the secondary for the transformer 18c. Since the readout relays RH1 through RH9 also have front contacts in series with the winding of the secondary for maintaining the secondary open when the by-pass circuit is closed, no short circuit of the secondary of the transformer 18c takes place.

It is pointed out that the transformer 18b is provided with ten times the turns ratio as the transformer 18a. Likewise, the transformer 18c is provided with ten times the turns ratio as appears on the transformer 18c. For this reason the full secondary output voltage developed by the transformer 18A is only $\frac{1}{10}$ of the full output voltage of the secondary of the transformer 18b and only $\frac{1}{100}$ from the full output voltage of the secondary of the transformer 18c. If it is assumed in the present example the output of each portion of the secondary of the transformer 18a is one volt and the output of each portion of the secondary of the transformer 18b is 10 volts, and since these output voltages are added in series, a total of 28 volts would appear on the output of the secondary of the transformer group 18. At the same time that the output voltage is being established in the transformer group 18, an output voltage is being established in the transformer group 19. If we again return to the primary section of the transformer group 19, it can be seen that when the count relay of the 5-minute period UM1 becomes energized, its front contact UM1e places the full source voltage of the A.C. source across the primary windings of the group transformers 19a, 19b and 19c. At the same time the contact UM1f of the relay UM1 assures the elimination of any shunt path for the primaries of the transformers 19a, 19b and 19c.

During the same period that the contact 4 is providing a count for the counting relays of the units, tens and hundreds associated with the transformer group 18, the contact 13 is also providing a count for the units, tens and hundreds relays associated with the transformer group 19. Since the contact 13 is associated with the watthour demand meter 11 connected to the tie line 12 for reading tie line power, it should be clear that contact 13 is operated in direct proportion to the amount of power being supplied over the tie line 12. The counting operation of the relays 1U1 through 1U10, 1T1 through 1T10 and 1H1 through 1H10 is exactly the same as the counting sequence described in connection with the counting relays U1 through U10, T1 through T10 and H1 through H10. A repeat of the sequence of operation of these relays will therefore not be made. If we assume that during the period in which the counting relays associated with the transformer group 18 has counted to 28, that the counting relays associated with the transformer group 19 have counted to the point where the 1T5 relay is energized and the 1U2 relay is energized, it can be seen that the count in this case has progressed to 52 showing the use of greater power over the tie line than the use of power being supplied by the generator 3. With the count relay 1T5 energized and its contact 1T5c closed, the readout relay 1RT5 becomes energized causing its contacts 1RT5c and 1RT5d to be closed and opened respectively. This results in five tap portions on the transformer secondary being energized in the transformer 19b. At the same time the energization of the relay 1U2 results in the closure of its contact 1U2C and the energization of the readout relay 1RU2. Energization of the readout relay 1RU2 in turn causes the relay to close its contact, 1RU2c and open its contact 1RU2d. This results in the energization of two tap portions of the secondary of the transformer 19a. Again in view of the fact that the hundreds count relays have not been energized in this sequence, a by-pass path past the secondary of the transformer 19c is completed over the back contacts of each of the readout relays 1RH1 through 1RH9. It is again pointed out that the windings ratio on the secondary of the transformer 19b is ten times the windings ratio of the transformer 19a and the windings ratio of the transformer 19c is ten times the transformer 19b.

In order to establish a maximum demand level desired to be acquired over the tie line, the manual setting tap changers MSU, MST, and MSH are provided for the transformers 19a, 19b and 19c, respectively. The manual setting tap changers MSU, MST and MSH provide additional secondary windings on each of the transformers 19a, 19b and 19c respectively, each of which is wound so as to subtract from the output of the combined secondaries of the transformers 19a, 19b and 19c. The amount of subtractive turns to be used in conjunction with the tap changers MSU, MST and MSH can be manually adjusted by the movable taps 34, 35 and 36, respectively. It is again pointed out that the subtractive turns of each are in direct proportion to the associated secondary. That is, the turns related to one step of the MST manual adjuster equal ten times that of the turns related to one step of the MSU adjuster and the turns related to one step of the MSH tap changer are equal to ten times the number of turns of those found on one step of the tap changer MST. Each of the secondaries of the transformers 19a, 19b and 19c and the subtractive manual adjusting turns MST, MSU and MSH are then series connected to provide an output voltage equivalent to the level established by the demand meter 11, during the first 5-minute period of the demand period, minus the voltage established by the manual adjusters MSU, MST and MSH. The outputs of the two transformer groups 18 and 19 are then serially and algebraically combined and fed through the conductors 25 and 26 to the rectifier 27. The output of the rectifier 27 is then used to control the magnetic amplifier 28 to readjust a governor and prime mover 29 for the generator 3 to the new demand level required to take care of the difference voltage established by the algebraic combination of the output of the transformer groups 18 and 19 as described hereinbefore. If the billing contract between the supplier and user of power is changed so that a different maximum demand over the tie line is to be honored, then it is only necessary to reset the taps 34, 35 and 36 to the new desired level.

The circuit results can be expressed mathematically in the following manner. The transformer group 18 provides an output that can be designated as $$E_1\left(\frac{R}{M}\right)$$

where:
$E_1$ is the input voltage;
$R$ is the number of secondary turns selected by the readout relays; and
$M$ is the elapsed time in the demand period.

This voltage is then compared with the output of the transformer group 19 which is represented by $$E_2\frac{(N_s-Q)}{M_1}$$

where:
$E_2$ is the input voltage to the transformer;
$N_s$ is the kilowatt hours established by the manual tap setters 34, 35 and 36 representing the tie lines;
$Q$ is the secondary turns established by the readout relays associated with the secondary of the transformer group 19; and $M_1$ is the unelapsed time in the demand period being monitored. It can be seen therefore that the required generator output or new load setting during the unelapsed part of the demand interval can be expressed by $$(KW_g)_2 = E_1\left(\frac{R}{M}\right) - E_2\frac{(N_s-Q)}{M}$$

which may be where $(KW_g)_2$ is the generator output requirement necessary to hold the desired demand level, expressed as $$(KW_g)_2 = \frac{(KWH_2)_1}{T_1} - \frac{(KWH_t)_2}{T_2}$$

where:
$(KWH_L)_1$ is the kilowatt hours to the load during the elapsed part of the demand interval,
$T_1$ is the elapsed part of the demand interval,
$(KWH_t)_2$ is the maximum demand limits on the tie line expressed in kilowatt hours for the total demand period less the kilowatt hours from the tie line during $T_1$, and where
$T_2$ is the unelapsed part of the demand interval.

Since numerous changes may be made in the above-described construction, and different embodiments of the invention may be made without departing from the spirit and scope thereof, it is intended that all matter contained in the foregoing description or shown in the accompanying drawings shall be interpreted as illustrative, and not in a limiting sense.

I claim as my invention:
1. A power demand control system comprising a power input tie line, and a load supply line, a first demand detector means connected to detect the demand on said input tie line, a second demand detector means connected to detect the demand on said load supply line, and computer means connected to said first and second demand means for sampling said first and second de- mand means, said computer means being connected to control the supply of power over said load supply line in response to the difference in said first and second demand detectors.

2. A power demand control system comprising a power input tie line, and a load supply line, a first demand detector means connected to detect the demand on said input tie line, a second demand detector means connected to detect the demand on said load supply line, and computer means connected to said first and second demand means for sampling said first and second demand means, said computer means being connected to control the supply of power over said load supply line in response to the difference in said first and second demand detector and maximum demand adjusting means in said computer means for adjusting the maximum demand level desired by said first demand detector.

3. A power demand control system comprising a power input tie line, and a load supply line, a first demand detector means connected to detect the demand on said input tie line, a second demand detector means connected to detect the demand on said load supply line, and computer means connected to said first and second demand means, said computer means being connected to control the supply of power over said load supply line in response to the difference in said first and second demand detector, said computer means comprising a transformer for each demand detector, each transformer having a detector control means for varying its output in response to its controlling demand detector.

4. A power demand control system comprising a power input tie line, and a load supply line, a first demand detector means connected to detect the demand on said input tie line, a second demand detector means connected to detect the demand on said load supply line, and computer means connected to said first and second demand means for sampling said first and second demand means, said computer means being connected to control the supply of power over said load supply line in response to the difference in said first and second demand detectors, said computer means comprising a transformer for each demand detector, each said transformer having a detector control means for varying its output in response to its controlling demand detector, said detector control means comprising counting relays for adjusting said transformers in proportion to said first and second demand detectors.

5. A power demand control system comprising a power input tie line, and a load supply line, a first demand detector means connected to detect the demand on said input tie line, a second demand detector means connected to detect the demand on said load supply line, and computer means connected to said first and second demand means for sampling said first and second demand means, said computer means being connected to control the supply of power over said load supply line in response to the difference in said first and second demand detectors, said computer means comprising a transformer for each demand detector, each said transformer having a detector control means for varying its output in response to its controlling demand detector, said detector control means comprising counting relays for adjusting said transformers in proportion to said first and second demand detectors, and timing means for controlling said computer means to periodically compare said transformer outputs.

6. A power demand control system comprising a power input tie line, and a load supply line, a first demand detector means connected to detect the demand on said input tie line, a second demand detector means connected to detect the demand on said load supply line, and computer means connected to said first and second demand means for sampling said first and second demand means, said computer means being connected to control the supply of power over said load supply line in response to the difference in said first and second demand detectors, said load supply line comprising a generator, said generator varying its output in response to said computer means.

7. A power demand control system comprising a power input tie line, and a load supply line, a first demand detector means connected to detect the demand on said input tie line, a second demand detector means connected to detect the demand on said load supply line, and computer means connected to said first and second demand means for sampling said first and second demand means, said computer means being connected to control the supply of power over load supply line in response to the difference in said first and second demand detector and maximum demand adjusting means in said computer means for adjusting the maximum demand level desired by said first demand detector, said computer means control comprising a magnetic amplifier having a stabilizing feedback responsive to said load supply line.

8. A power demand level control system comprising a load circuit, a first power input to said load circuit, a second limited power input to said load circuits, a first demand detector connected to detect the power demand of said first power input, a second demand detector connected to detect the power demand of said second limited power input, a first sensing means connected to said first demand detector for providing an output voltage inversely proportional to the power supplied over the first power input divided by the remaining time of a selected demand period, a second sensing means connected to said second demand detector for providing an output voltage proportional to the power supplied over the second power input, first control means for connecting to said first and second sensing means for algebraically combining said first and second sensing means outputs, second control means connected between said first control means and said second limited power input for varying said second power input in response to the output of said first control means.

9. A power demand level control system comprising a load circuit, a first power input to said load circuit, a second limited power input to said load circuits, a first demand detector connected to detect the power demand of said first power input, a second demand detector connected to detect the power demand of said second limited power input, a first sensing means connected to said first demand detector for providing an output voltage inversely proportional to the power supplied over the first power input divided by the remaining time of a selected demand period, a second sensing means connected to said second demand detector for providing an output voltage proportional to the power supplied over the second power input, first control means for connecting to said first and second sensing means for algebraically combining said first and second sensing means outputs, second control means connected between said first control means and said second limited power input for varying said second power input in response to the output of said first control means, said first control means comprising a prime mover driven generator and magnetic amplifier controlled governor for said prime mover driven generator.

10. A power demand level control system comprising a load circuit, a first power input to said load circuit, a second limited power input to said load circuits, a first demand detector connected to detect the power demand of said first power input, a second demand detector connected to detect the power demand of said second limited power input, a first sensing means connected to said first demand detector for providing an output voltage inversely proportional to the power supplied over the first power input divided by the remaining time of a selected demand period, a second sensing means connected to said second demand detector for providing an output voltage proportional to the power supplied over the second power input, first control means for connecting to said first and second sensing means for algebraically combining said first and second sensing means outputs, second control means connected between said first control means and said second limited power input for varying said second power input in response to the output of said first control means, said first control means comprising a prime mover driven generator and magnetic amplifier controlled governor for said prime mover driven generator, and feedback means connected between said second limited power input and said magnetic amplifier for stabilizing said generator.

No references cited.